United States Patent
Somura

[11] Patent Number: 6,045,839
[45] Date of Patent: Apr. 4, 2000

[54] ICE FOR COOL DRINKS OF LIQUORS REQUIRING NO DILUENT

[76] Inventor: Katsuzo Somura, 4-4, Chuo-5Chome, Nakano-Ku, Tokyo, Japan

[21] Appl. No.: 09/253,797

[22] Filed: Feb. 22, 1999

[51] Int. Cl.[7] .............................. A23F 3/16; A23L 2/00; F25C 1/00; A23P 1/00; B65D 85/72

[52] U.S. Cl. .............................. 426/115; 426/66; 426/86; 426/112; 426/393; 426/524; 426/592; 426/597; 426/512; 62/371; 62/457.3

[58] Field of Search .................................... 426/393, 112, 426/115, 86, 66, 524, 592, 597; 62/371, 457.3

[56] References Cited

U.S. PATENT DOCUMENTS

| | | | |
|---|---|---|---|
| 2,667,422 | 1/1954 | Kaufman | 426/86 |
| 2,667,423 | 1/1954 | Simpson | 426/86 |
| 2,955,044 | 10/1960 | Tupper | 426/393 |
| 3,647,472 | 3/1972 | Speech et al. | 426/393 |
| 3,779,372 | 12/1973 | de Lloret | 426/115 |
| 4,018,904 | 4/1977 | Muraoka | 426/86 |
| 4,061,782 | 12/1977 | Baxter | 426/86 |
| 4,184,310 | 1/1980 | Shelby | 426/115 |
| 4,990,169 | 2/1991 | Broadbent | 425/66 |
| 5,013,562 | 5/1991 | Somura | 426/66 |
| 5,157,929 | 10/1992 | Hotaling | 426/66 |
| 5,341,648 | 8/1994 | Umemura et al. | 426/66 |
| 5,493,866 | 2/1996 | Hotaling | 426/393 |
| 5,698,247 | 12/1997 | Hall | 426/66 |

FOREIGN PATENT DOCUMENTS

| | | | |
|---|---|---|---|
| 2-142446 | 5/1990 | Japan | 426/66 |
| 2354422 | 5/1975 | United Kingdom | 426/66 |

OTHER PUBLICATIONS

Cooking, Hints & Tips, Christine France, Dk Publications p. 127, 1997.
Woman's Day, Encyclopedia of Cookery, vol. 11 Fawcett Publ. pp. 1815–1817, 1966.
Family Circle, Illustrated Library of Cooking vol. 1, p. 111, 1972.
Woman's Day, Encyclopedia of Cookery, vol. 3 Fawcett Publ. p. 462, 1966.
Womans Day Enclopedia of Cookery, vol. 6 Fawcett Publ. pp. 924, 925, 1966.
Step–By–Step, 50 Classic Cocktails, Van Den Berg Smithmark Publ. pp. 12, 13, 18, 30, 78, 79, 1996.
Modern Packaging Sep. 1952 pp. 110, 111, 112, 113, 214 & 215.

*Primary Examiner*—Steven Weinstein
*Attorney, Agent, or Firm*—Oliff & Berridge, PLC

[57] ABSTRACT

Ice is prepared by freezing a diluent, such as oolong tea, lemon water, green tea, mineral water, or pickled ume extract in water, and crushing the frozen diluent into lumps of varying sizes. The lumps are sprayed with water to bind them together and are refrozen under pressure in the form of multi-void ice blocks. The ice blocks are packaged in cups and sealed by a film cap. A plurality of cups containing the ice blocks are provided in a case.

7 Claims, 3 Drawing Sheets

F I G. 1
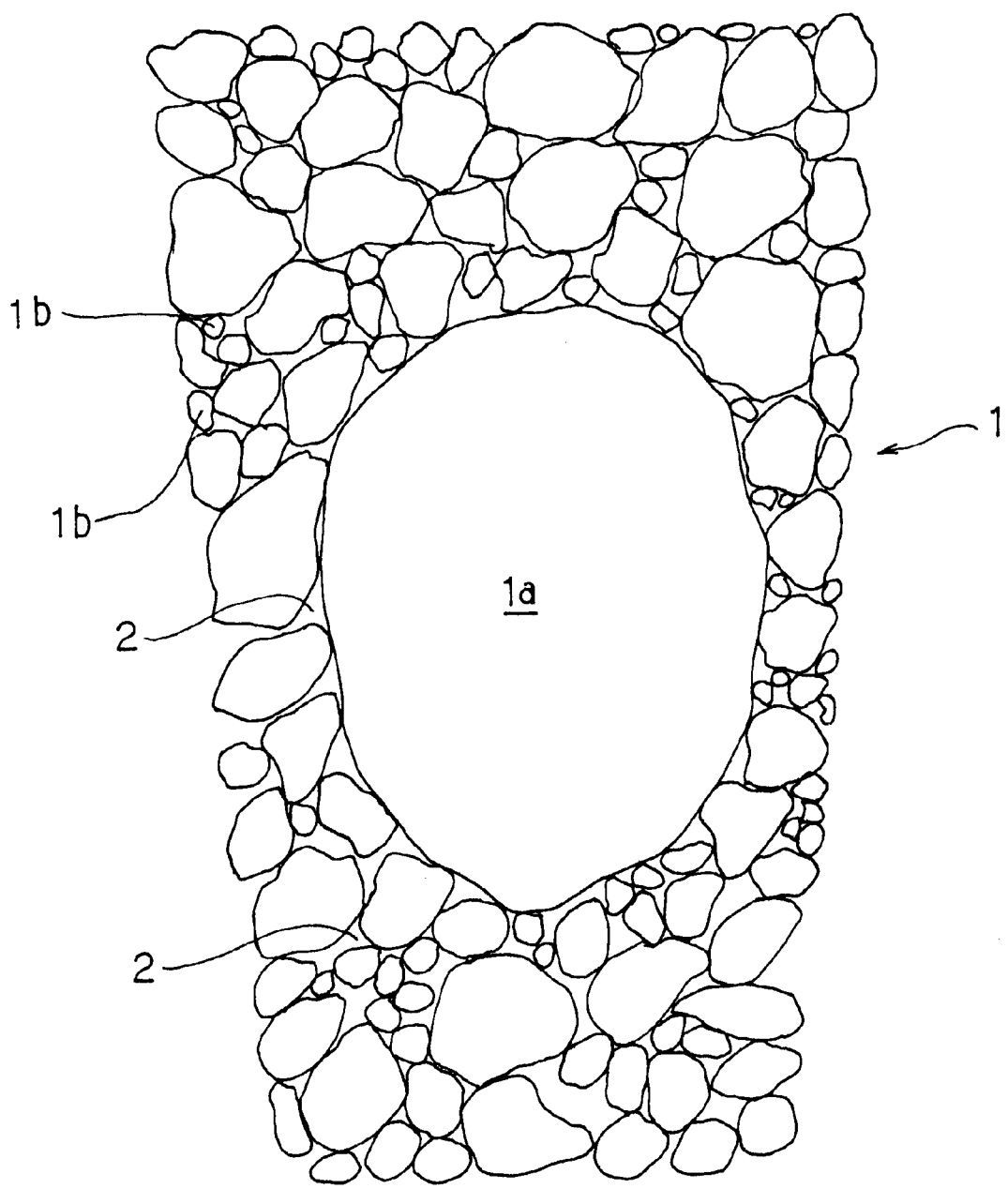

US 6,045,839

ICE FOR COOL DRINKS OF LIQUORS REQUIRING NO DILUENT

TECHNICAL FIELD

This invention relates to the ice for cool drinks of liquors requiring no diluent.

BACKGROUND OF THE INVENTION

In order to enjoy iced and diluted liquors, such as shochu, i.e., Japanese spirits distilled from sweet potatoes, which is diluted with oolong tea, lemon water, green tea, powdered tea in water, and pickled ume extract in water, or whisky diluted with water, one has to prepare the liquor, the diluent, and ice separately.

Cracked ice of relatively large sizes is generally used for these drinks as such ice lasts long. Small shaved ice is not usually utilized because it dilutes the liquor too quickly and it remains in the form of ice for so short a time that one feels it troublesome to prepare for an additional supply of ice, although shaved ice can cool the liquor quickly.

The above-described cracked ice of large sizes is on sale in the market as it is stocked in the shop freezer, packed in polyvinyl chloride bags in an amount necessary for 10 or more cups of drinks. The cracked ice in these bags is ordinarily utilized.

Under the present circumstances described above, one has to prepare bottled diluent, ice in a container from which ice can be taken out in a certain volume, and glasses separately, in addition to the liquors. It takes a lot of time to prepare for all these materials, and the diluting liquids have to be supplied frequently. Such preparation is inconvenient and hard to enjoy. It is troublesome to bring frequently the diluting liquids to the table. Furthermore, me has to wait for a while until the drinks are cool enough.

SUMMARY OF THE INVENTION

This invention has been achieved in view of the current inconvenience. The object of this invention is to provide ice for cool drinks of liquors requiring no diluent. According to this invention, it is possible to save drinkers any trouble in preparing and supplying diluents, to let ice last long, and to serve drinks rapidly at desired coolness without waiting for the drinks to cool down.

In order for the afore-mentioned object to be achieved, the ice for cool drinks of liquors requiring no diluent, according to this invention, comprises the lumps of ice made of a diluent, in sizes as large as pebble-like cracked ice rocks and as small as ice flakes. These lumps of ice in various sizes are frozen independently with one another in the form of multi-void blocks containable in a certain cup.

The lumps of ice in the form of multi-void blocks are made of a number of diluents including oolong tea, lemon water, high-quality green tea, mineral water, powdered green tea in water, and pickled ume extract in water, and are melted in the cup after the liquor has been poured. The diluent is automatically supplied as these blocks begin to melt, thus making it unnecessary to supply the diluent from outside. Since the liquor is not thinned by the addition of a diluent, the uniform taste of the liquor is conveniently maintained in spite of the melting ice.

The liquor, when it is poured into the cup, penetrates the void and makes the ice blocks separate from one another. First of all, small flakes begin to melt, followed by the larger blocks. In this way, a quick cooling effect is achieved. In the meantime, the largest ice rock exists for a long time and the cooling effect continues to work. Cooling is thus quick and lasts long.

BRIEF DESCRIPTION OF THE DRAWINGS

FIG. 1 is an enlarged view showing the detailed structure of the ice according to this invention.

DETAILED DESCRIPTION OF THE PREFERRED EMBODIMENTS

Figure 2:
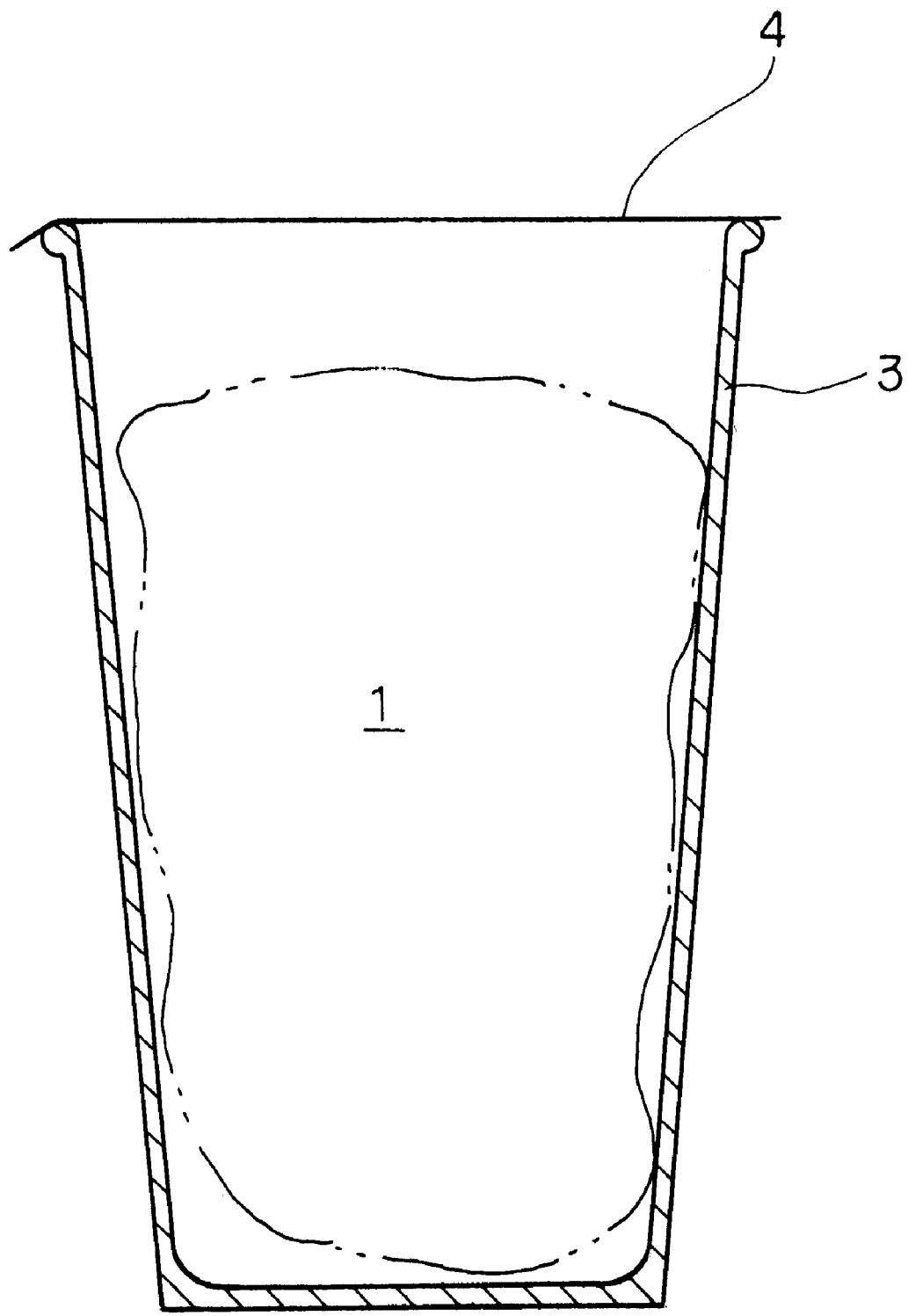
FIG. 2 is an illustration of the cup in which to contain and sell the ice according to this invention.

This invention is further described by referring to FIG. 1.

FIG. 1 shows an embodiment of the ice for cool drinks of liquors requiring no diluent. The ice according to this invention can be prepared by freezing the diluent, such as oolong tea, lemon water, high-quality green tea, mineral water, powdered tea in water, or pickled ume extract in water, and crushing thus-obtained ice pillars or ice plates with a crusher. The crushed ice ranges in size from as large as pebble-like rocks 1a to as small as ice flakes 1b in a mixed state. The lumps of ice are sprayed with water to bind them with one another and are refrozen under pressure into the form of multi-void ice blocks 2 to be filled in a cup-like container.

The size of crushed ice actually ranges from 40 mm to 2 mm in diameter, with 30 mm, 20 mm, 10 mm, and 5 mm in between. The lumps of ice in these sizes melt in different timing, and those of a larger size melt in delayed timing than those of a smaller size. In the case of pickled ume, its flakes can be mixed with the aqueous extract solution.

When a liquor is poured onto the ice 1 in the cup, the liquor penetrates and occupies the void, making the lumps of crushed ice separate from one another. Small ice flakes 1b first begin to melt, quickly cool the liquor, and dilute it at a constant concentration.

The crushed ice 1a of a large size slowly melts, remains to be ice for a long time, and continues to cool the drink. In addition; the largest lump supplies the liquor with the diluent at such a steady rate that the drink always gives the same taste. The drinker needs only adding the liquor.

One no longer needs to prepare for a diluent and ice separately.

If one wants to enjoy only the diluent, one can leave the diluent standing without pouring any liquor.

Figure 3:
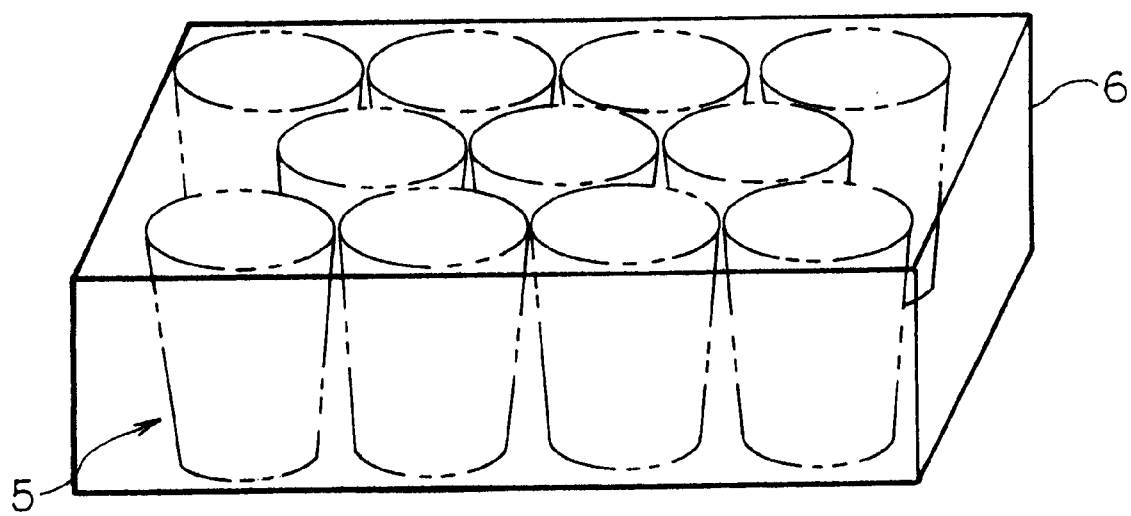
FIG. 3 is an illustration of the ice, according to this invention, filled in cups and packed in a case.

FIGS. 2 and 3 show embodiments of a cup in which to contain the ice of this invention and a case in which to pack a certain number of cups for sales in the market.

As shown in FIG. 2, the above-described ice 1 is packed in a cup 3 made of a transparent plastic material which is distributable through sales routes, such as automatic vending machines. The cup is thermally sealed with a film cap 4. As an economical package for household and business use, a certain number of cups 5 can be packed into a case 6 (in which cups can be prevented from being damaged by mutual collision). Conveniently, the drinker no longer needs to prepare diluents and crushed ice separately. The drinker will also be stimulated by the colors of frozen diluent blocks (brown of oolong tea, green of green tea, and water-clear brilliance of lemon water and mineral water.

What is claimed is:

1. A package of frozen diluent for cooling and diluting drinks, comprising:

a drinking cup;

a molded block of frozen diluent sized and shaped to fit in said cup and contained therein, said block of frozen diluent comprising a plurality of lumps of a frozen liquid diluent for diluting said drinks, said plurality of lumps being bonded together to form said block, said plurality of lumps within said block varying in size from 2 mm to 40 mm and said block further including a plurality of voids therein between the plurality of bonded lumps of frozen diluent, said plurality of voids within said block varying in size from 5 mm to 30 mm such that upon adding said drink to said cup containing said block, the smaller frozen lumps first begin to melt and quickly cool the drink and dilute it at a constant concentration whereas the larger frozen lumps melt more slowly and continue to cool and dilute the drink for a long time; and a cover sealing the cup.

2. The package according to claim 1 wherein the diluent is selected from the group consisting of:

oolong tea, lemon water, green tea, mineral water, powdered green tea in water, and pickled ume extract.

3. The package according to claim 1 wherein the cup is formed of plastic.

4. The package according to claim 3 wherein the plastic is transparent.

5. The package according to claim 1 wherein the cover is a film cap.

6. The package according to claim 5 wherein the film cap is thermally sealed over the cup.

7. A case comprising a plurality of packages according to claim 1.

* * * * *